US007157667B2

(12) United States Patent
Gramlich et al.

(10) Patent No.: US 7,157,667 B2
(45) Date of Patent: Jan. 2, 2007

(54) COOKING DEVICE

(75) Inventors: Walter Gramlich, Bruchsal (DE); Bernhard Goetz, Zaisenhausen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 11/256,355

(22) Filed: Oct. 21, 2005

(65) Prior Publication Data

US 2006/0049188 A1 Mar. 9, 2006

Related U.S. Application Data

(63) Continuation of application No. PCT/EP2004/004328, filed on Apr. 23, 2004.

(30) Foreign Application Priority Data

Apr. 25, 2003 (DE) ................................ 103 18 859

(51) Int. Cl.
*A21B 3/02* (2006.01)
*A21B 3/10* (2006.01)

(52) U.S. Cl. ........................ 219/391; 362/92; 126/190; 126/200

(58) Field of Classification Search ..................... None
See application file for complete search history.

(56) References Cited

U.S. PATENT DOCUMENTS

| | | | | |
|---|---|---|---|---|
| 2,339,085 | A * | 1/1944 | Luckiesh | 362/92 |
| 3,991,738 | A * | 11/1976 | Krebs | 126/200 |
| 4,007,727 | A * | 2/1977 | Krebs | 126/200 |
| 4,880,955 | A * | 11/1989 | Nitzinger et al. | 219/758 |
| 5,022,380 | A * | 6/1991 | Faurel et al. | 126/190 |
| 5,836,669 | A * | 11/1998 | Hed | 362/92 |
| 5,873,646 | A * | 2/1999 | Fjaestad et al. | 362/92 |
| 6,059,420 | A * | 5/2000 | Rogers | 362/92 |
| 6,320,164 | B1 * | 11/2001 | Millett | 219/391 |
| 6,467,475 | B1 * | 10/2002 | Leutner et al. | 126/190 |
| 6,578,978 | B1 * | 6/2003 | Upton et al. | 362/92 |

FOREIGN PATENT DOCUMENTS

| | | | |
|---|---|---|---|
| DE | 32 46 437 | | 6/1984 |
| DE | 85 18 078 | | 8/1985 |
| DE | 36 43 354 | | 6/1988 |
| DE | 38 27 528 | | 8/1989 |
| DE | 3827528 | A * | 8/1989 |
| DE | 38 08 716 | | 9/1989 |
| DE | 3808706 | A * | 9/1989 |
| EP | 0 513 758 | | 11/1992 |
| EP | 0 976 986 | | 5/2003 |
| FR | 1.452.726 | | 4/1966 |
| JP | 02183723 | A * | 7/1990 |

* cited by examiner

*Primary Examiner*—Joseph Pelham
(74) *Attorney, Agent, or Firm*—Russell W. Warnock; Craig J. Loest

(57) ABSTRACT

A cooking device including a cooking area, a door for closing the cooking area and a lighting system for lighting the cooking area. The lighting system includes a light source and at least one reflector arranged in the internal space of the door, which reflects light from the light source into the cooking area. In order to reduce mechanical strain applied to the light source, it is arranged outside the door and emits light towards the reflector inside the door to be reflected into the cooking area.

12 Claims, 5 Drawing Sheets

COOKING DEVICE

CROSS REFERENCE

This application is a continuation, under 35 U.S.C. § 120, of copending international application No. PCT/EP2004/004328, filed Apr. 23, 2004, which designated the United States; this application also claims the priority, under 35 U.S.C. § 119, of German patent application No. 103 18 859.2, filed Apr. 25, 2003; the prior applications are herewith incorporated by reference in their entirety.

BACKGROUND OF THE INVENTION

1. Field of the Invention

The invention relates to a cooking device with a cooking area and a cooking device door for closing off the cooking area and a lighting device for lighting the cooking area, which has at least one reflector, arranged in a door interior of the cooking device door and reflects light from a light source of the lighting device into the cooking area.

2. Description of Related Art

DE-A-38 08 716 discloses a device for lighting the interiors of domestic appliances. The lighting device is built into a baking oven door and has bulged reflectors, which are designed stretching out longitudinally and have a parabolic cross-section and are arranged at the level of the viewing window. A number of lighting elements is preferably assigned to the reflectors. Dazzle-free and thoroughly uniform internal lighting of the oven muffle or respectively of the cooking area in all feed levels is achieved without any of the muffle walls having to be engaged.

DE-A-36 43 354 discloses another lighting device for a baking oven closable by a baking oven door. Lamps and assigned inclined reflector surfaces 21 are arranged in a door interior of the baking oven door. This ensures optimal lighting of the baking space, whereby the lamps are not visible from the outside.

BRIEF SUMMARY OF THE INVENTION

The object of the invention is to provide a cooking device, in which permanently reliable operation of the lighting device is ensured.

In accordance with the invention a light source of the lighting device is provided outside the cooking device door and in optical connection with a reflector arranged in the door interior. Since the light source is provided outside the cooking device door, the light source is not stressed mechanically by shaking coming from when the cooking device door is opened and closed. This guarantees adequate reliable operation of the light source of the lighting device.

It is particularly advantageous if the light source is arranged outside a sealed area provided between the cooking device door and a muffle flange enclosing the cooking area opening. Contamination of the light source by liquid from cooking goods is prevented by its being arranged outside the sealed area. Heat stress on the light source is also reduced.

It can be advantageous if the light source of the lighting device is mounted in the muffle flange. This creates a favourable installation site, since the light source is easily accessible and can be exchanged trouble-free when the cooking device door is open.

It is particularly preferred if the light source is arranged under a muffle floor, which creates spatial separation of the light source from the electronic components of the cooking device arranged above the cooked goods device muffle. The electronic components are thus protected from the waste heat of the light source. As well, there is no additional warming of the door handle of the cooking device door due to waste heat from the light source.

Conventional light sources for illuminating the cooking area of the cooking device muffle have a rating between 40 and 100 W. The light source is accordingly warmed during operation. It is advantageous to avoid overheating of the light source for the sake of increasing the service life of the light source. It is therefore particularly favourable to arrange the light source right beside a door hinge provided in the cooking device, i.e. up to a distance of 5 to 6 cm away. Door hinges are usually solid sheet metal parts with correspondingly high heat storage capacity. Heat deflection from the light source to the door hinge is accordingly advantageous. To enable heat transfer via heat radiation is it preferred to arrange both the light source and the door hinge in a hollow chamber. The hollow chamber is preferably ballasted against a heat-insulating mantle, which usually encloses the cooking area.

In the case of a light source arranged under the muffle floor it is also beneficial to arrange a heat-protective element between the light source and the bottom-heating heater unit.

Heat deflection of the waste heat from the light source can also be prevented by the light source being arranged in an air-conducting duct.

An air current guided through the air-conducting duct enables advantageous cooling of the light source. In this case, while the cooking device is running in the air-conducting duct a forced air current and/or air convection flow can be set.

With the inventive cooking device the light source is arranged outside the cooking device door, while the assigned reflector is arranged inside the cooking device door. In this case it is favourable for high lighting output if light losses are minimised during transfer of the light from the light source to the cooking device door. This can be achieved if an optical window, through which the light of the light source radiates, is provided in the cooking device door.

Light losses can occur in particular in a cavity between the light source and the cooking device door. Here it is preferred if a light channel element is arranged in the cavity, by which the light of the light source is transferred to the cooking device door.

The light channel element can be preferably arranged detachably with the cooking device door or at a slight distance away. When the cooking device door is open the light channel element is arranged separately from the door, whereby the inside of the door can be cleaned without problem. In a further embodiment the optical window can be designed in the cooking device door in a depression, into which the light source or the light guiding element extends.

DESCRIPTION OF BRIEF THE SEVERAL VIEWS OF THE DRAWING(S)

An exemplary embodiment of the invention is explained hereinafter with reference to the appended figures. In the figures.

DETAILED DESCRIPTION OF THE INVENTION

Figure 1:
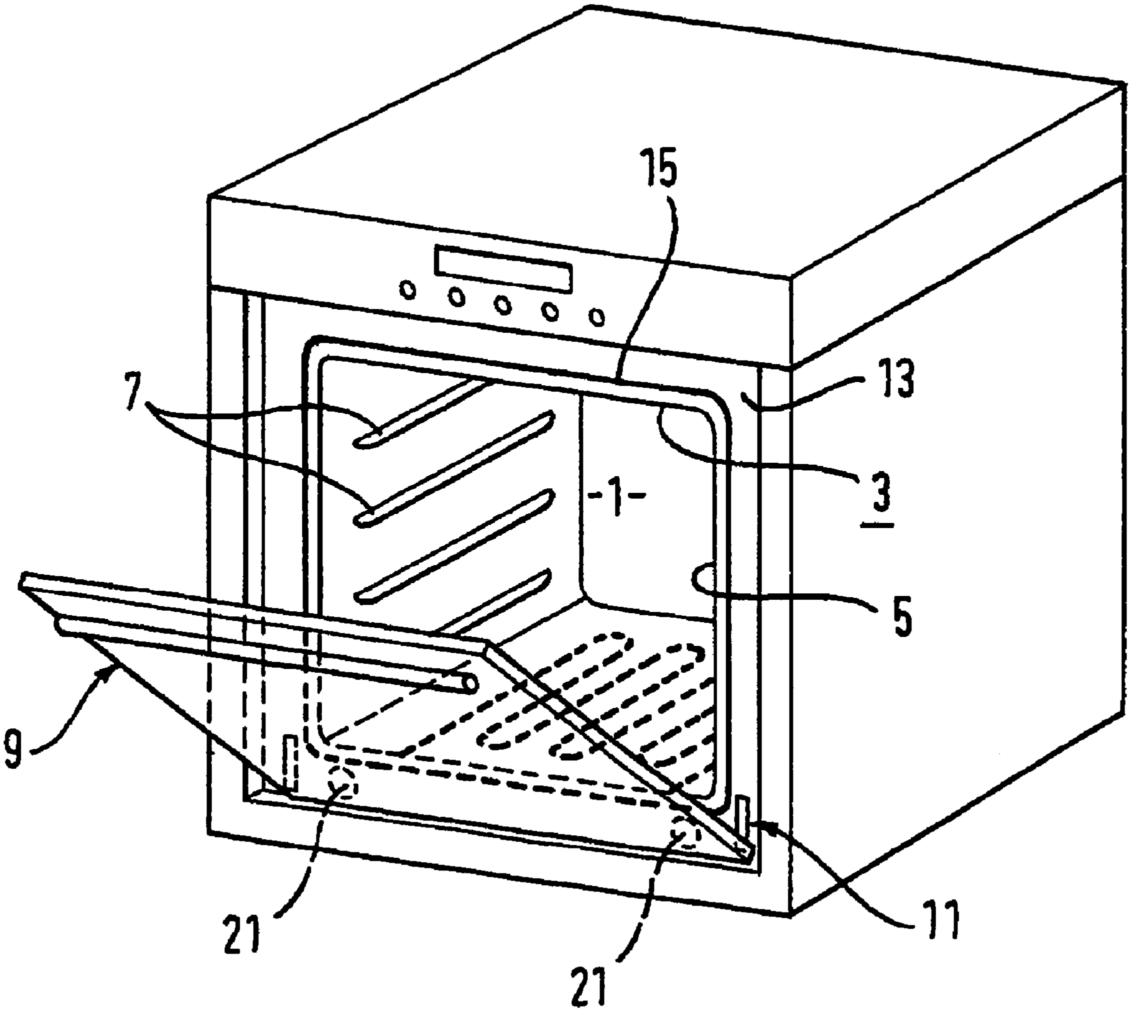
FIG. 1 is a perspective view of a cooking device with the cooking device door open.

FIG. 1 shows a cooking device including a rectangular baking chamber 3. The baking chamber 3 has a front baking-chamber opening 5. Horizontal slide-in ribs 7 are constructed on both side walls of the baking chamber 3 These are used to slide in and support baking sheets in horizontal cooking chamber levels (not illustrated). The front baking chamber opening 5 can be closed by means of a front cooking-device door 9. This is pivotally hinged in the lower area of the cooking device by means of lateral door hinges 11. The baking-chamber opening 5 is bordered by a front baking-chamber flange 13. Affixed to the baking-chamber flange 13 is a ring seal 15, which extends around the baking-chamber opening 5 on the circumferential side.

Figure 2:
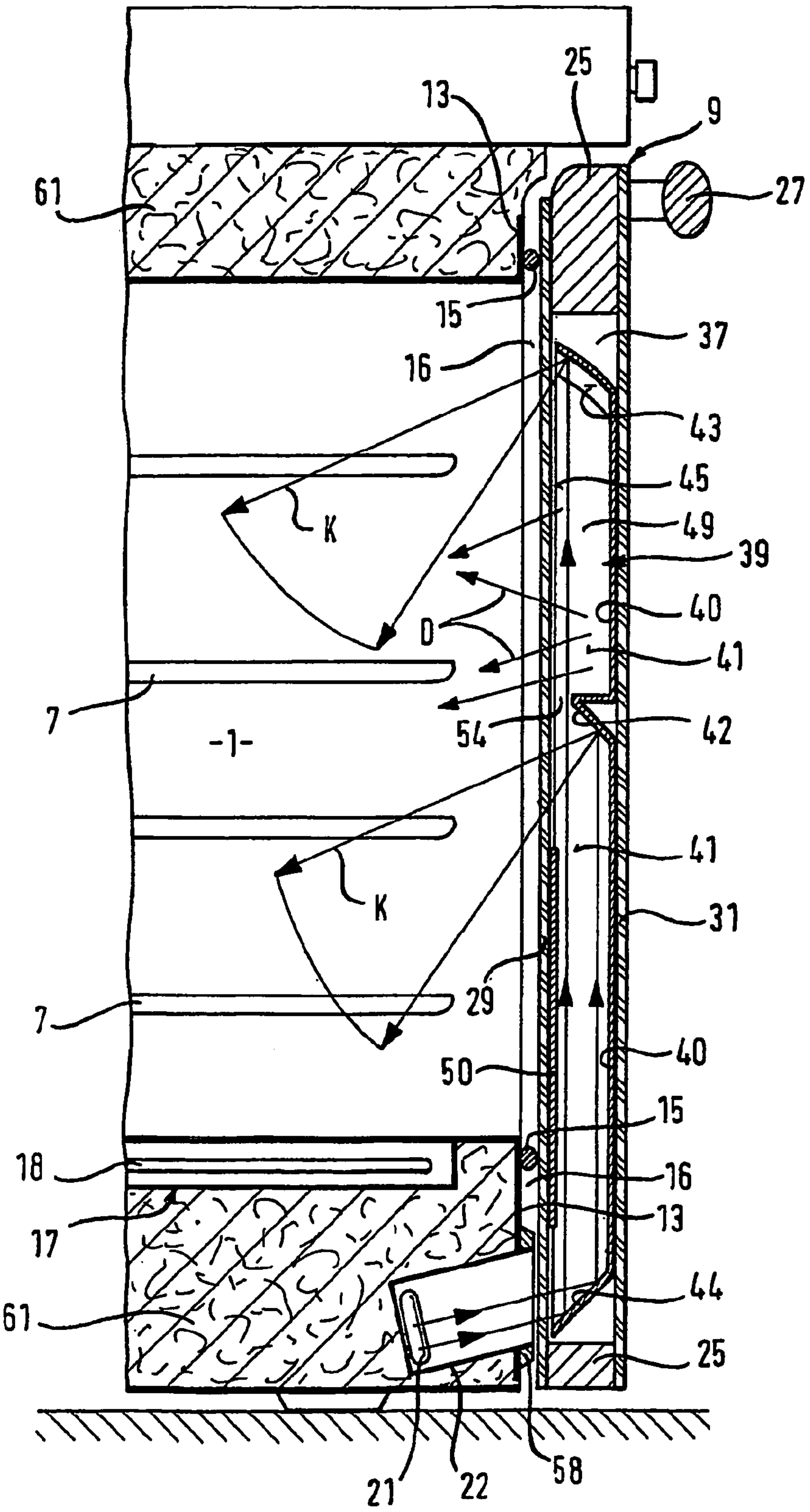
FIG. 2 is a side sectional view of a section of the cooking device.

FIG. 2 shows the cooking device with the cooking-device door 9 closed. In this case, the cooking device door 9 abuts against the ring seal 15 with its inner side facing the cooking chamber 1. The front baking-chamber flange 13 is located at a distance of around 7 mm from the cooking device door 9 by means of an intermediate space 16. Attached to an underside of a bottom of the baking chamber 3 of the cooking device is a heating element housing 17, as shown in FIG. 2, which holds an underheat heating element 18. The heating-element housing 17 extends as far as close to the front baking-chamber flange 13. Likewise arranged underneath the bottom of the baking chamber is a baking oven lamp 21. Its housing 22 is held in the front baking-chamber flange 13. The light from the lamp 21 is reflected into the cooking chamber 1 via the cooking-device door 9.

Figure 3:
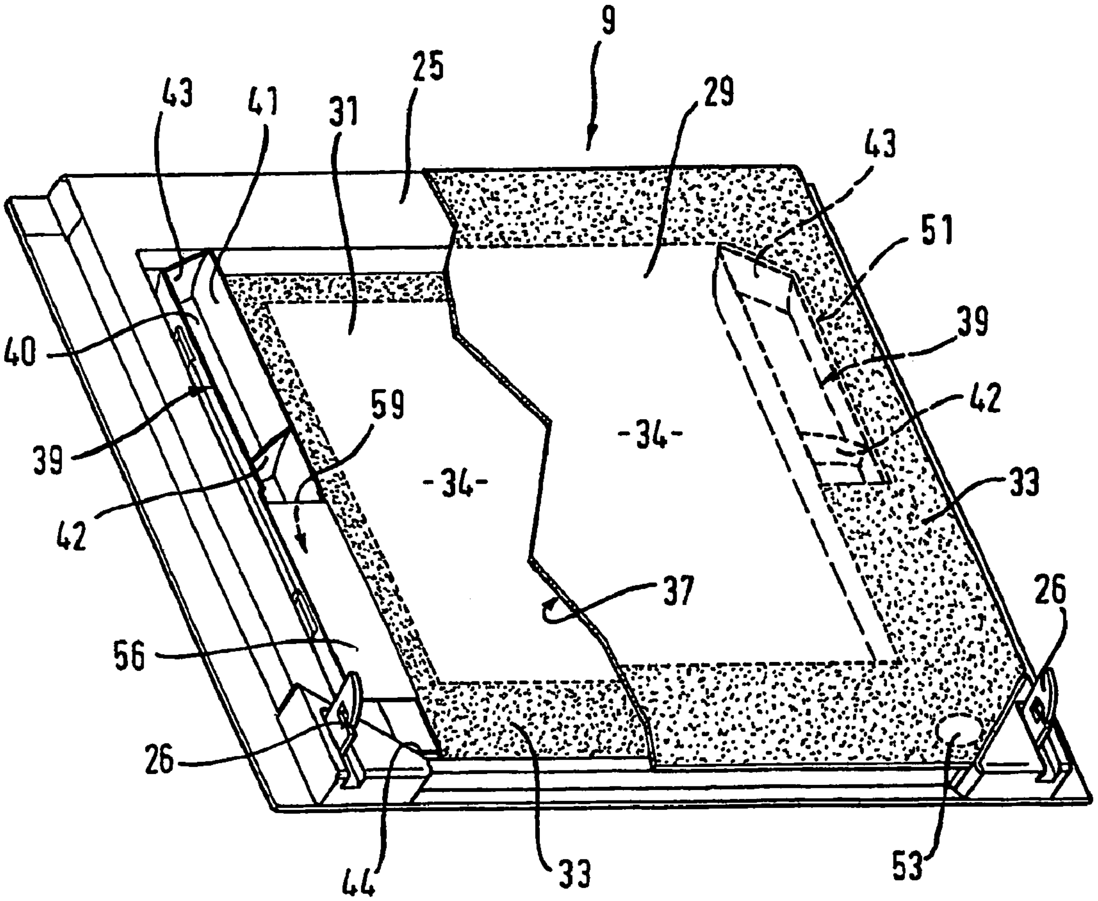
FIG. 3 is a perspective view of the cooking device door with a door inner pane partly broken away.

The structure of the cooking device door 9 can be seen from FIGS. 2 and 3. Consequently, the cooking-device door 9 has a rectangular doorframe 25 made of a deep-drawn sheet metal, which runs around the circumference. A door handle 27 is affixed on an upper frame strip of the door frame 25. The cooking device door further has a door inner pane 29 facing the cooking chamber 1 and a front door outer pane 31 which are spaced apart from one another. For cleaning reasons the door inner pane 29 is held detachably on the door frame 25 by means of snap-in connections which are not shown. The front outer pane 31 on the other hand is fixedly connected to the door frame 25. The two panes 31 and 29 are made of a transparent glass ceramic material and have opaque printing 33. These each surround transparent rectangular viewing areas or viewing windows 34 of the door panes 29, 31. The door frame 25 together with the door panes 29, 31 spaced apart from one another delimits a door interior space 37 which is adequately sealed against moisture from the outside. In the lower corner areas of the door frame 25 it is possible to see movable hinge portions 26 of the door hinges 11 which are fixed inside the door frame 25. The movable hinge portions 26 can be suspended in corresponding fixed hinge portions of the door hinge 11 on the housing side.

Figure 4C:
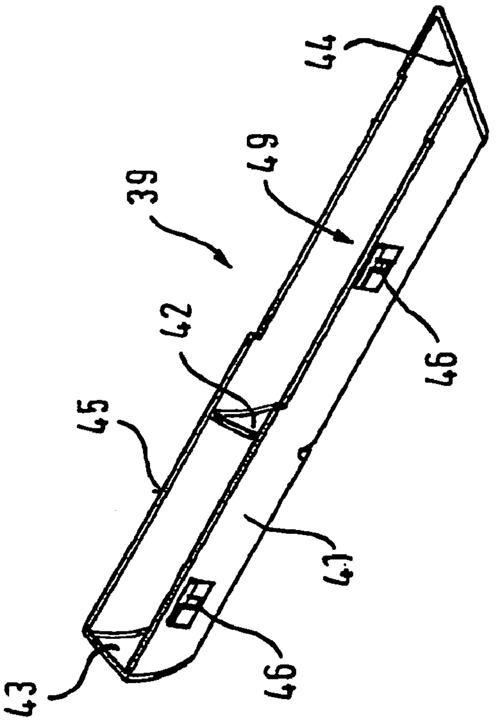
FIGS. 4a to 4c show a reflector arranged in the cooking device door viewed from above and from the side and in a perspective view.
Figure 4B:
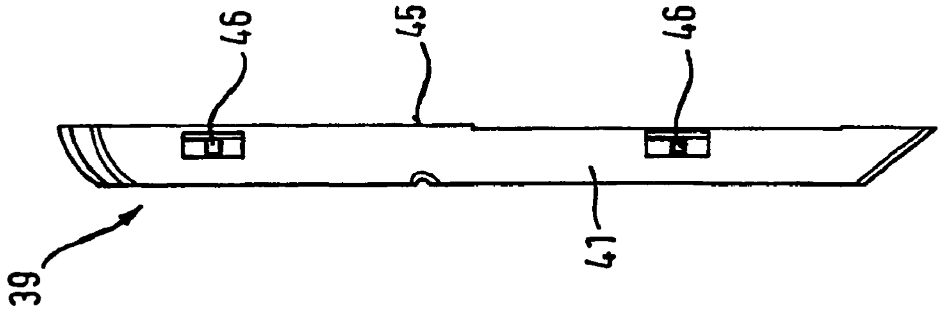
Figure 4A:
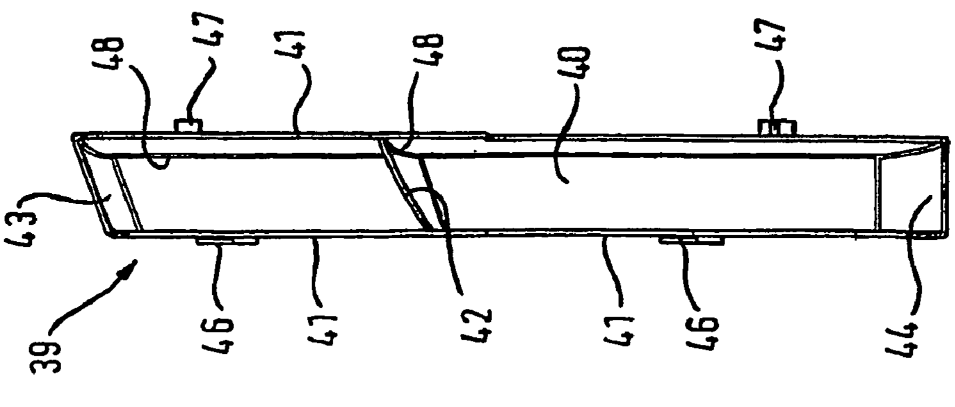

Located inside the door interior space 37 are two elongated reflectors 39 as shown in FIG. 3. These are arranged so that they are hidden from view behind the printing 33 of the door outer pane 31 and extend along the sides of the viewing window 34. The reflectors 39 are made of a solid plastic injection moulding which is resistant to thermal stresses and is stable in shape. One of the reflectors 39 is shown in FIGS. 4a to 4c. Accordingly, the reflector 39 is constructed as having an almost U-shaped cross-sectional profile so that it extends in a groove shape in one longitudinal direction. The reflector 39 has a flat groove bottom 40, which is surrounded by raised longitudinal side walls 41. The groove bottom 40 and the longitudinal side walls 41 delimit a light-guiding compartment 49.

Located inside the light-guiding compartment 49 are the transverse reflector surfaces 42, 43, 44, which run transversely to the groove bottom 40 and the longitudinal side walls 41. In this case, the outer transverse reflector surfaces 43, 44 close the opposing narrow sides of the reflector 39. As is shown in FIG. 4c, the upper free edges 45 of the outer transverse reflector surfaces 43, 44 and the longitudinal side walls 41 run flush at the same distance from the groove bottom 40. The flush profile of the upper edges 45 is interrupted by a gradation into which a cover described subsequently can be inserted.

Both the groove bottom 40, the longitudinal side walls 41 and the transverse reflector surface 44 are constructed as flat. On the other hand, the transverse reflector surfaces 42, 43 are constructed as spherically arched. Formed on the outside on the longitudinal side walls of the reflector 39 are mounting hooks 46 which are suspended to hold the reflector 39 in corresponding sections of the door frame 35 which are not shown. Formed on the outside on the opposing longitudinal side wall 41 are retaining attachments 47 which can be used to optionally retain a further central door pane which is not shown. Edge transitions 48 between the transverse reflector surfaces 42, 43, 44 and the longitudinal side walls 41 and the groove bottom 40 are constructed as rounded.

It can be seen from FIG. 3 that the two reflectors 39 are arranged mirror-symmetrically with respect to one another on the sides of the rectangular viewing window 34. In this case, the reflectors 39 abut with their upper free edges 45 against the door inner pane 29 or are only slightly at a distance therefrom. Thus, the reflector 39 together with the door inner pane 29 delimits a light-guiding compartment 49, which is substantially closed on the interior side of the door. Alternatively, an additional sealing element can be provided to seal light gaps between the free upper edge 45 of the reflector 39 and the door inner pane 29. Escape of light from the light-guiding compartment 49 into the door interior space 37 is thus extensively reduced.

Provided in the printing 33 of the door inner pane 29 are additional transparent areas 51, which project from the sides of the rectangular viewing window 34. The transparent areas 51 extend in the upper area of the viewing window and are aligned with the light-guiding compartment 46 of the reflectors 39. Light reflected by the reflector 39 can be reflected into the cooking chamber 1 through the transparent areas 51 of the door inner pane 29. Further, circular optical windows 53 are formed in the lower area of the door inner pane 29, which are likewise transparent areas in the printing 33. The optical windows 53 are aligned with the transverse reflector surfaces 44 of the reflectors 39. Thus, all focused light from the lamp 21 passes through the corresponding window 53 onto the opposing transverse reflector surface 44. The transverse reflector surface 44 is positioned obliquely with respect to the groove bottom 40 so that the incident light is guided into the light-guiding compartment 49 as indicated in FIG. 2.

Consequently, a beam path of the light between the transverse reflector surfaces 42, 43, 44 runs substantially parallel to the longitudinal side walls 41 and to the groove bottom 40. In this case, some of the light is incident on the middle transverse reflector surface 42 and is reflected therefrom into the cooking chamber 1 as a light cone K. The middle transverse reflector surface 42 is located in the light-guiding compartment 49 below the upper edge 45 of the reflector 39. As a result, a light penetration gap 54 is obtained between the middle transverse reflector surface 42 and the door inner pane 29, as shown in FIG. 2. Some of the light is passed on through this gap to the transverse reflector surface 43 positioned thereafter. This reflects the lights into the cooking chamber 1 as a further light cone K. In this case, the transverse reflector surfaces 42, 43 are aligned such that their light cones K irradiate the cooking chamber 1 obliquely downwards. Thus, only the upper side of baking sheets arranged in the cooking chamber 1 is advantageously illuminated.

The reflectors 39 are fully reflection-coated on the inside. A small fraction of the light guided into the light-guiding compartment 49 of the reflector 39 is thus reflected into the cooking chamber 1 as diffuse scattered light D at the reflection-coated longitudinal side walls 40 and the groove bottom 41 (see FIG. 2). The longitudinal side walls 40 and the groove bottom 41 serve as additional longitudinal reflector surfaces in addition to the transverse reflector surfaces. The diffuse scattered light D is reflected into the cooking chamber 1 at arbitrary angles. As a result of the combination of the focussed light cones K with the diffuse scattered light D, the following is achieved: on the one hand, food on the baking sheets in the cooking chambers is visually emphasised by the light cones K. On the other hand, however, edge zones in the cooking chamber 1 are also adequately illuminated by the diffuse scattered light D. As a result of the rounded transitions 48 between the first and second reflector surfaces the low light intensity of the diffuse scattered light D goes over continuously into the high light intensity of the light cones K. Such a continuous transition of the light intensity is further improved if the transverse reflector surfaces 42, 43 are roughened. As a result, a small portion of the light reflected into the cooking chamber by the second transverse reflector surfaces 42, 43 is reflected as diffuse scattered light.

According to FIG. 3, the open upper side of the reflectors 39 is covered by a cover 56, which is reflection-coated on the inside, in the area between the middle transverse reflector surface 42 and the lower transverse reflector surface 44. An opaque light channel 59 is thereby formed in the reflector 39. This ensures that the light from the lower transverse reflector surface 44 is guided with almost no losses of light to the middle transverse reflector surface 42. For aesthetic reasons the cover 56 is arranged out of sight behind the printing 33 of the door inner pane 29. The cover 56 is arranged in a gradation made in the upper free edge 45 and ends flush with the upper free edge 45 of the reflector 39.

The lamp 21 is arranged in the lamp housing 22 as shown in FIG. 2. The lamp housing 22 is constructed as hollow-cylindrical and is aligned so that it slopes upwards at an angle of about 10° in order to increase the distance from the underheat heating element 18. The lamp housing 22 is held by its open front end in the front baking-chamber flange 13. The end of the housing held in the baking-chamber flange 13 is surrounded by a frame-like light channel element 58. The light channel element 58 is positioned on the baking-chamber flange 13 at the front. It thus projects into the intermediate space 16 between the baking chamber flange 13 and the door inner pane 29.

When the cooking device door 9 is closed, a face of the frame-like light channel element 58 projecting into the intermediate space 16 abuts against the door inner pane 29 or is only a short distance therefrom. In FIG. 2 this distance is about 1 to 2 mm. The light channel element 58 thus forms a light channel sufficiently closed with respect to the intermediate space 16 through which the light from the lamp 21 can be transmitted into the cooking-device door 9. Disadvantageous light effects in the bottom area of the cooking device can thereby be largely avoided. At the same time, the light is transmitted from the lamp 21 on the side of the cooking device to the transverse reflector surface 44 on the door side almost without losses.

In order to reduce heat dissipation from the cooking chamber 1, the cooking chamber 1 together with the heating element housing 17 is surrounded by a heat-insulating jacket 61. The heat-insulating jacket 61 almost completely fills a housing area provided outside the baking chamber 3 of the cooking device.

Figure 5:
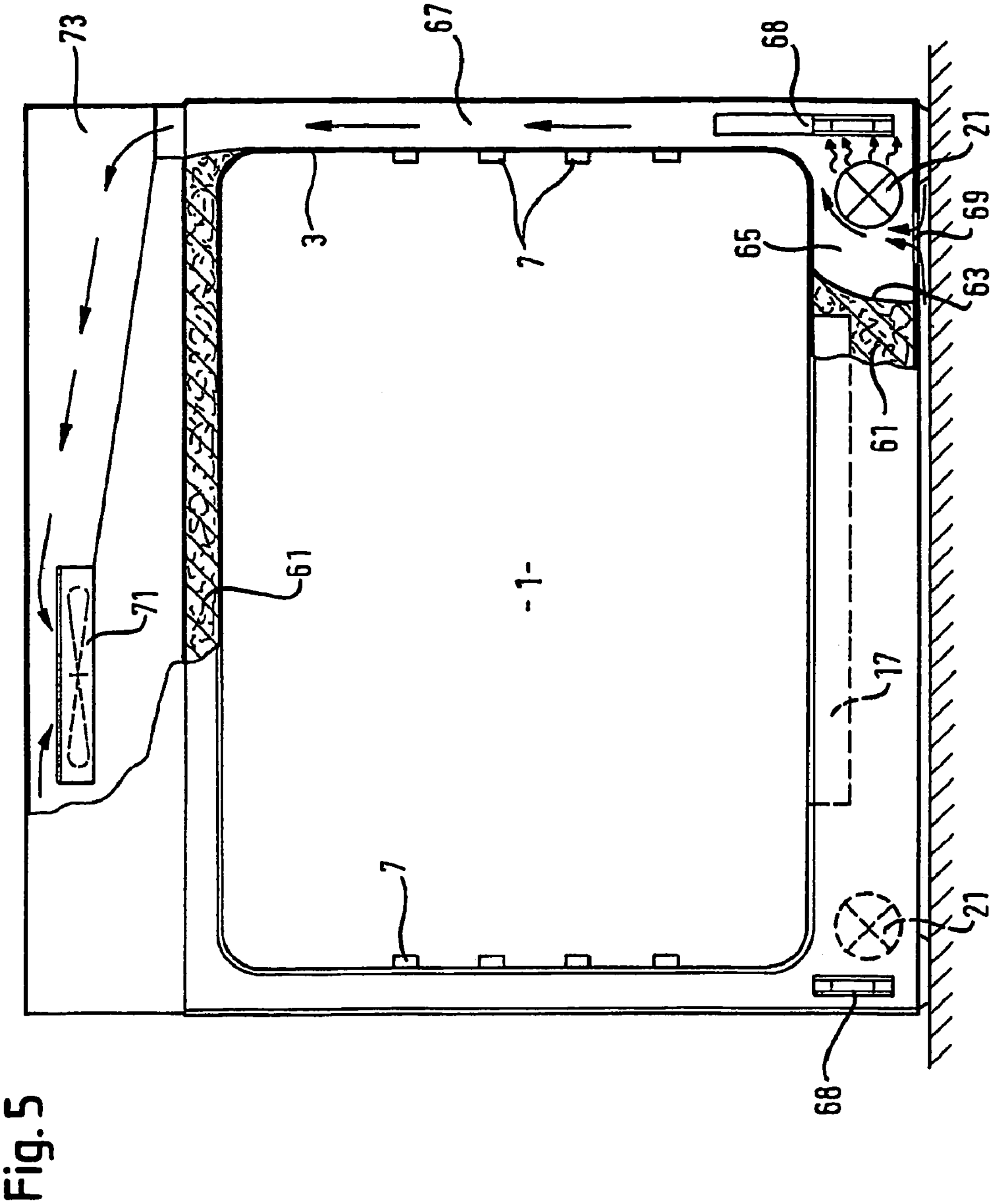
FIG. 5 shows a front view of the cooking device without the cooking device door and in a partial section.

As can be seen from FIG. 5, a separating plate 63 is provided in the housing compartment in the area of the lamp 21. The separating plate 63 forms a hollow chamber 65 separated from the heat-insulating jacket 61 in which the lamp 21 is located. The separating plate 63 serves as an additional heat protection between the lamp 21 and the underheat heating element 18. Also provided in the hollow chamber 65 is a fixed hinge portion 68 of the door hinge 11. The hinge portion 68 is usually made of a solid deep-drawn metal sheet and has a correspondingly high heat storage capacity. In this case, the lamp 21 is also located only at a small distance over about 5 cm from the fixed hinge portion 68 of the door hinge 11. Waste heat produced by operation of the lamp 21 can thus be diverted to the fixed hinge portion 68 by means of thermal radiation indicated by the arrows in FIG. 5. The operating temperature of the lamp 21 is thereby reduced and its lifetime correspondingly increased.

In order to further reduce the operating temperature of the lamp 21, the hollow chamber 65 can form a part of an air-guiding channel 67. The air-guiding channel 67 has air entry slits 69 on the side of the housing bottom through which air can enter into the channel 67. The air-guiding channel 67 extends vertically upwards outside the baking chamber 3 of the cooking device as far as a blower chamber 73 provided above the baking chamber 3 of the cooking device. Provided in the blower chamber 73 is a known cool air blower arrangement 71 which sucks air from the blower chamber 73 in the direction of the arrows in order to cool electronic components of the cooking device. According to the invention ambient air is initially sucked into the hollow chamber 65 at the bottom. In this case, the air, which has been sucked in flows around the lamp 21 in the direction of the arrow and is guided into the blower chamber 73 via the air-guiding channel 67.

The invention claimed is:

1. A cooking device, comprising:

a cooking area having an opening;

a cooking device door for closing off said cooking area opening;

a light source;

a lighting device for lighting up said cooking area;

said lighting device including at least a first reflector;

said lighting device including said first reflector arranged in an interior of said cooking device door;

said first reflector reflects light from said light source of said lighting device into said cooking area; and said light source arranged outside said cooking device door and radiates light in the direction of said first reflector, wherein said light source is arranged in a selected one of an arrangement wherein said light source is arranged outside a sealed area formed between said cooking device door and a muffle flange enclosing said cooking area opening and said light source is mounted in said muffle flange, said light source is arranged under a muffle floor of a muffle flange enclosing said cooking area opening, said light source is arranged adjacent to a door hinge provided in the cooking device, said light source is arranged separated by means of a heat-protective element from a bottom-heating heater unit, and said light source is arranged in an air-conducting duct.

2. The cooking device as claimed in claim 1, wherein while the cooking device is running at least one of a forced air current and an air convection flow is generated in said air-conducting duct.

3. The cooking device as claimed in claim 1, including said cooking device door having an optical window formed therein through which said light source light radiates onto said reflector and a light channel element arranged between said light source and said cooking device door through which said light source light radiates onto said reflector, said light channel element arranged at least one of detachably substantially against said cooking device door or at a slight distance away from said cooking device door and including a depression formed in said cooking device door and an optical window embodied in said depression into which at least one of said light source and said light channel element extend.

4. The cooking device as claimed in claim 1, including a hollow chamber formed in the device and said light source and a fixed component of a door hinge are arranged in said hollow chamber.

5. A cooking device, comprising:

a cooking area having an opening on one side thereof;

a cooking device door for closing off said cooking area opening at said one side of said cooking area;

a light source arranged outside said cooking device door and said cooking area and oriented relative to said cooking area such that no light radiated by said light source is radiated along a direct line-of-sight direction toward said cooking area opening; and a lighting device for lighting up said cooking area;

said lighting device including at least a first reflector, said lighting device including said first reflector arranged in an interior of said cooking device door and said first reflector and said light source being oriented relative to one another such that said light source radiates light in the direction of said first reflector and said first reflector reflects such light into said cooking area.

6. The cooking device according to claim 5, including said light source arranged outside a sealed area formed between said cooking device door and a muffle flange enclosing said cooking area opening.

7. The cooking device according to claim 5, including a door hinge and said light source arranged adjacent to said door hinge provided in the cooking device.

8. The cooking device according to claim 5, including a bottom-heating heater unit and said light source separated by means of a heat-protective element from said bottom-heating heater unit.

9. The cooking device according to claim 5, including said cooking device door having an optical window formed therein through which said light source light radiates onto said reflector.

10. The cooking device according to claim 9, including a light channel element arranged between said light source and said cooking device door through which said light source light radiates onto said reflector.

11. The cooking device according to claim 10, including said light channel element arranged at least one of detachably substantially against said cooking device door or at a slight distance away from said cooking device door.

12. The cooking device according to claim 11, including a depression formed in said cooking device door and said optical window embodied in said depression into which at least one of said light source and said light channel element extend.

* * * * *